(12) United States Patent
Brooks

(10) Patent No.: US 9,491,528 B2
(45) Date of Patent: Nov. 8, 2016

(54) COMMUNICATION MANAGEMENT IN AN OPTICAL NETWORK

(71) Applicant: Time Warner Cable Enterprises LLC, New York, NY (US)

(72) Inventor: Paul D. Brooks, Weddington, NC (US)

(73) Assignee: Time Warner Cable Enterprises LLC, New York, NY (US)

( * ) Notice: Subject to any disclaimer, the term of this patent is extended or adjusted under 35 U.S.C. 154(b) by 423 days.

(21) Appl. No.: 14/061,008

(22) Filed: Oct. 23, 2013

(65) Prior Publication Data

US 2015/0110489 A1 Apr. 23, 2015

(51) Int. Cl.
*H04B 10/00* (2013.01)
*H04Q 11/00* (2006.01)
*H04J 14/00* (2006.01)

(52) U.S. Cl.
CPC ...... *H04Q 11/0067* (2013.01); *H04Q 11/0071* (2013.01); *H04Q 2011/0064* (2013.01)

(58) Field of Classification Search
CPC ............... H04B 10/2575; H04B 10/25751; H04B 10/25753; H04B 10/25754; H04B 10/25756; H04B 10/25759; H04B 10/272; H04B 10/278
See application file for complete search history.

(56) References Cited

U.S. PATENT DOCUMENTS

2008/0273877 A1* 11/2008 Palacharla .......... H04J 14/0282
398/64
2012/0321315 A1* 12/2012 Timm ................ H04Q 11/0067
398/67

\* cited by examiner

*Primary Examiner* — Daniel Dobson
(74) *Attorney, Agent, or Firm* — Chapin IP Law, LLC

(57) ABSTRACT

A communication resource in a network environment analyzes upstream communications received over multiple passive optical networks. The upstream communications are received from multiple client devices in different passive optical networks. Based on analysis of the upstream communications, via an active or passive approach, a corresponding communication resource detects in which of the multiple passive optical networks each of the client devices reside. A scheduler resource can be configured to use the class information as a basis to schedule subsequent upstream communication, avoiding occurrence of optical beat interference.

39 Claims, 10 Drawing Sheets

| CLASS INFORMATION 131 | |
|---|---|
| CLASS | MEMBERS |
| CLASS #1 (P.O.N. 191-1) PORT 180-1 | 120-1 120-2 120-3 |
| CLASS #2 (P.O.N. 191-2) PORT 180-2 | 121-1 121-2 |
| CLASS #3 (P.O.N. 191-3) PORT 180-3 | 122-1 122-2 122-3 |
| ... | ... |

FIG. 3

| TIME-BASED RANGE BINS | CLASS INFORMATION 531 | |
|---|---|---|
| | CLASS | MEMBERS |
| (T1 TO T2) | CLASS #1<br>(P.O.N. 191-1)<br>PORT 180-1 | 120-1<br>120-2<br>120-3 |
| (T2 TO T3) | CLASS #2<br>(P.O.N. 191-2)<br>PORT 180-2 | 121-1<br>121-2 |
| (T3 TO T4) | CLASS #3<br>(P.O.N. 191-3)<br>PORT 180-3 | 122-1<br>122-2<br>122-3 |
| ... | | ... |

FIG. 7

COMMUNICATION MANAGEMENT IN AN OPTICAL NETWORK

BACKGROUND

In conventional RFoG (Radio Frequency over Glass) optical communication networks, so-called Optical Network Units (ONUs) are typically deployed at each of multiple customer premises locations. In a conventional RFoG network, a single strand of optical fiber is typically shared among multiple downstream ONUs (typically 32, but other numbers are possible). In the downstream direction, a light splitting resource divides downstream light power to the ONUs such that a portion of the downstream light power is transmitted to each ONU. Via the downstream light, each of the ONUs receives light containing identical information in the downstream (cable network company to corresponding subscriber customer) direction. Typically, a signal analyzer analyzes the received signal to determine which data is directed to the corresponding subscriber. In certain instances, a portion of content encoded on a respective downstream optical signal can include data available for consumption by multiple subscribers.

For upstream (customer to company) transmissions, each of the ONUs can include a respective laser transmitter that is manufactured to identical specifications. As such, the transmitters transmit on the same or nearly identical wavelength of light in the upstream direction to the company. When two downstream located laser transmitters transmit at the same time in an upstream direction, the optical receiver at the company-side facility (such as at a cable modem termination system) receives optical power from both laser transmitters. An optical detection device in the upstream device converts the optical signal into a respective electrical output that is proportional to the instantaneous sum of the combined optical powers contributed by the two lasers. Since the wavelengths of these low-cost lasers (upstream optical transmitters in the ONUs) are not precisely controlled, in most cases they are separated in the optical spectrum by a spacing that is sufficient to consider only the sum of the optical powers at the receiver output. If the RF (Radio Frequency) signals feeding the two ONUs are on different RF channels, both channels will appear in the electrical generated by the upstream located receiver.

BRIEF DESCRIPTION OF EMBODIMENTS

Conventional ways of transmitting communications in a network environment suffer from a number of deficiencies. For example, in certain instances, simultaneous transmission of optical signals from multiple downstream located devices in an upstream direction to a receiver is prone to a phenomenon known as optical beat interference. Optical beat interference can occur when two or more transmitters simultaneously transmit upstream optical signals at the same or nearly identical wavelength. The occurrence of optical beat interference damages the upstream optical signal, preventing the upstream receiver from deciphering communications from either of the simultaneously transmitting optical transmitters.

Embodiments herein include multiple ways of managing communications in a respective network environment to avoid optical beat interference.

For example, a communication resource in a network environment analyzes upstream communications received over multiple passive optical networks. The upstream communications are received from multiple client devices in different passive optical networks. Based on analysis of the upstream communications, the communication resource (disposed upstream) detects in which of the multiple passive optical networks each of the client devices reside. The communication resource produces class information indicating in which of multiple passive optical networks each of the multiple client devices resides.

A process of learning in which of multiple networks a respective client device resides can be achieved in any of a number of different ways including an active approach or a passive approach.

Active Approach

According to an active approach embodiment, groupings of client devices reside in different passive optical networks. Each of the passive optical networks is communicatively coupled to a respective port of a multi-port optical resource. The multi-port optical resource receives upstream communications from the multiple client devices over multiple ports. The client devices can be any type of downstream located communication resource such as a cable modem, set-top box, computer, etc.

In one example embodiment, a first port of the multi-port optical resource receives upstream communications from a first grouping of client devices residing in a first passive optical network; a second port of the multi-port optical resource receives upstream communications from a second grouping of client devices residing in a second passive optical network; and so on. Accordingly, each port receives communications from a different set of communication downstream resources. Once each port receives these communications in the optical domain, the light signal present at each port is converted to an electrical signal prior to being combined with the output of the other client groupings. Any interference caused by optical beat interference created in one group of receivers will thus prevent transmissions in other groups of clients (because the interference also gets converted into the electrical domain and is combined with "good" network transmissions) even though they are not in the same optical network.

By further way of a non-limiting example, the multi-port optical resource demodulates the communications received from the client devices in the different passive optical networks. Subsequent to demodulating, the multi-port optical resource analyzes the received upstream communications to identify a unique identifier value (such as a network address) associated with a respective upstream communication.

Based on which of the ports each of the communications are received, and unique identifier values such as a network addresses in the received communications, the multi-port optical resource produces class information indicating in which of the multiple passive optical networks each of the client devices resides. For example, client devices detected as being in a first passive optical network are assigned to a first class; client devices detected as being in a second passive optical network are assigned to a second class; and so on. Accordingly, a respective class assignment indicates in which of the multiple passive optical networks each of the client devices reside.

In one non-limiting example embodiment, the multi-port optical resource forwards the class information to an upstream resource such as a cable modem termination system or other suitable resource. The upstream resource uses the class information to schedule future upstream communications from the client devices in the different passive optical networks such that no two or multiple more client devices in the same passive optical network transmit at the same time, while not preventing devices in different passive optical networks that share an electrical combiner and thus a CMTS (Cable Modem Termination System) input port from transmitting at the same time. As previously discussed, the client devices can be configured to include an optical transmitter, each of which transmits at substantially the same wavelength. Scheduling of upstream communications from only one client device at a time in a respective passive optical network prevents optical beat interference. Conventional optical systems may allow scheduling for upstream transmissions. However, the difference here is that efficiency is gained when the outputs of multiple networks are electrically combined prior to being connected to a CMTS upstream input port, by virtue of the fact that up to one modem per network can be scheduled to transmit at the same time.

In one non-limiting example embodiment, upstream (customer to company facility) DOCSIS (Data Over Cable Service Interface Specification) RF signals generated by a customer modem (client device) are bursty in nature. Each burst is modulated with data that among other functions uniquely identifies each modem (in a packet or codeword header or other location in each burst), such as for example the modem's MAC address. An RFoG (RF over Glass) receiver in this invention is provided with the ability to demodulate and decode data, read these unique identifiers, associate them (via table or as appended in a data stream) with data that informs on RFoG receiver differentiation among receivers connected to a shared CMTS (Cable Modem Termination System) port, and stores and/or forwards this association to the CMTS via a message interface or other data conveyance mechanism.

Once this data is known to the CMTS, the CMTS scheduling code then disallows simultaneous transmissions in cases where the ONUs are on the same receiver, and allows them in cases where they are on different receivers, thereby both preventing OBI while significantly improving the efficiency of the overall upstream communications.

Passive Approach

Groupings of client devices reside in different passive optical networks in a similar manner as discussed above. For example, each of the passive optical networks is communicatively coupled to a respective port of a multi-port optical resource. The multi-port optical resource receives upstream communications from the multiple client devices over multiple ports.

The multi-port optical resource includes detector resources to convert the communications received on the multiple ports into respective electrical signals. For example, a first optical detector receives optical communications from a first group of client devices residing in a first passive optical network; a second optical detector receives optical communications from a second group of client devices residing in a second passive optical network; and so on.

The first optical detector converts a received optical signal on the first port into a first electrical signal (such as a first RF signal); the second optical detector converts a received optical signal on the second port into a second electrical signal (such as a second RF signal); and so on. A combiner resource in the multi-port optical resource combines the first electrical signal, second electrical signal, etc., to produce a single RF output signal. The multi-port optical resource transmits the RF output signal to an upstream resource such as a cable modem termination system.

Each of the communication paths extending from the client devices in a passive optical network to the combiner resource can be configured to include a respective delay element. The transit times associated with communications from client devices in the first passive optical network fall within a first time range; transit times associated with communications from client devices in the second passive optical network fall within a second time range; and so on. In one embodiment, the CMTS is already required to perform this "fine ranging" function, so is already aware of these timing differences, with no need for additional "delay elements."

In one embodiment, although not necessary, the upstream resource can be configured to generate class information indicating in which of the passive optical networks each of the client devices reside based on a transit time associated with the communications. For example, the upstream resource can detect that a transit time (such as round trip time) associated with a communication from a first client device (having a first unique network address) falls in a first time range. The upstream resource classifies the first client device (as specified by the first unique network address) as residing on the first passive optical network. The upstream resource can detect that a transit time (such as round trip time) associated with a communication from a second client device (having a second unique network address) falls in a second time range. The upstream resource classifies the second client device (as specified by the second unique network address) as residing in the second passive optical network.

In this manner, based on different transit times caused by delay elements on respective communication paths, the upstream resource is able to determine in which of the multiple passive optical networks each of the client devices resides.

In one embodiment, the analyzer resource produces the class information to include network addresses. For example, the analyzer can be configured to produce the class information to map network addresses of the multiple client devices to a respective passive optical network depending on which of the multiple optical ports the upstream communications are received. Inclusion of the network addresses in a respective class indicates in which of the multiple passive optical networks the respective client devices reside.

In accordance with further embodiments, the upstream resource uses the class information to schedule future upstream communications from the client devices in the different passive optical networks such that no more than one client device transmits in the upstream direction at a time. As previously discussed, the client devices can be configured to include an optical transmitter, each of which transmits at substantially the same wavelength. Scheduling of only one client device at a time in a respective passive optical network prevents optical beat interference.

In one non-limiting example embodiment, the scheduler resource can schedule simultaneous upstream communications from different passive optical networks. For example, the server resource can be configured to enable a first client device in a first passive optical network to communicate data (such as at a first RF carrier frequency) at substantially the same time as a second client device in a second passive optical network communicates data upstream (such as at a second RF carrier frequency) to the multi-port optical resource. In such an instance, optical beat interference is avoided because the upstream communications from different passive optical networks are received on different optical ports of the multi-port optical resource.

In an RFoG network, a (most often) long run of fiber optic cable (several kilometers) connects the company facility (distribution hub, headend, central office, outdoor cabinet, etc.) with a group of typically 32 potential customers (and perhaps 16 ONUs). These ONUs are typically much closer to each other (within one km) than they are to the company facility. Since the round trip delay is primarily due to the fiber distance, groups of ONUs sharing an RFoG receiver will naturally have similar round trip delays, and these delays are also likely to differ from another group of ONUs sharing a different receiver.

According to embodiments herein, various methods can be employed to assure that ONUs connected to each RFoG receiver have round trip delays that do not overlap with other groups of ONUs connected to different RFoG receivers sharing a CMTS port.

In accordance with one embodiment, optical cable length can be purposely added to one or more of the RFoG receiver links to increase round trip delays and provide "time guard bands" to facilitate simple CMTS detection, differentiation, and/or sorting of ONU transmissions.

In accordance with another embodiment, when a large group of RFoG receiver outputs converge in a common company facility, they can be connected such that "time guard bands" are maintained. For instance, if two RFoG receivers have ONUs with similar round trip times, we can purposely avoid connecting their outputs to the same CMTS port.

These and other more specific embodiments are disclosed in more detail below.

Note that any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment includes a computer readable storage medium and/or system having instructions stored thereon. The instructions, when executed by computer processor hardware, causes the computer processor hardware (such as one or more processor devices) to: analyze upstream communications received over multiple passive optical networks, the upstream communications received from multiple client devices; based on analysis of the upstream communications, detect in which of the multiple passive optical networks each of the client devices reside; and produce class information indicating in which of multiple passive optical networks each of the multiple client devices resides.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for producing and using class information indicating in which passive optical network different client devices reside. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 3 is an example diagram illustrating an example of class information indicating in which of multiple passive optical networks each of multiple communication resources resides according to embodiments herein.

FIG. 7 is an example diagram illustrating an example of generating class information based on time-based range bins according to embodiments herein.

Figure 1:
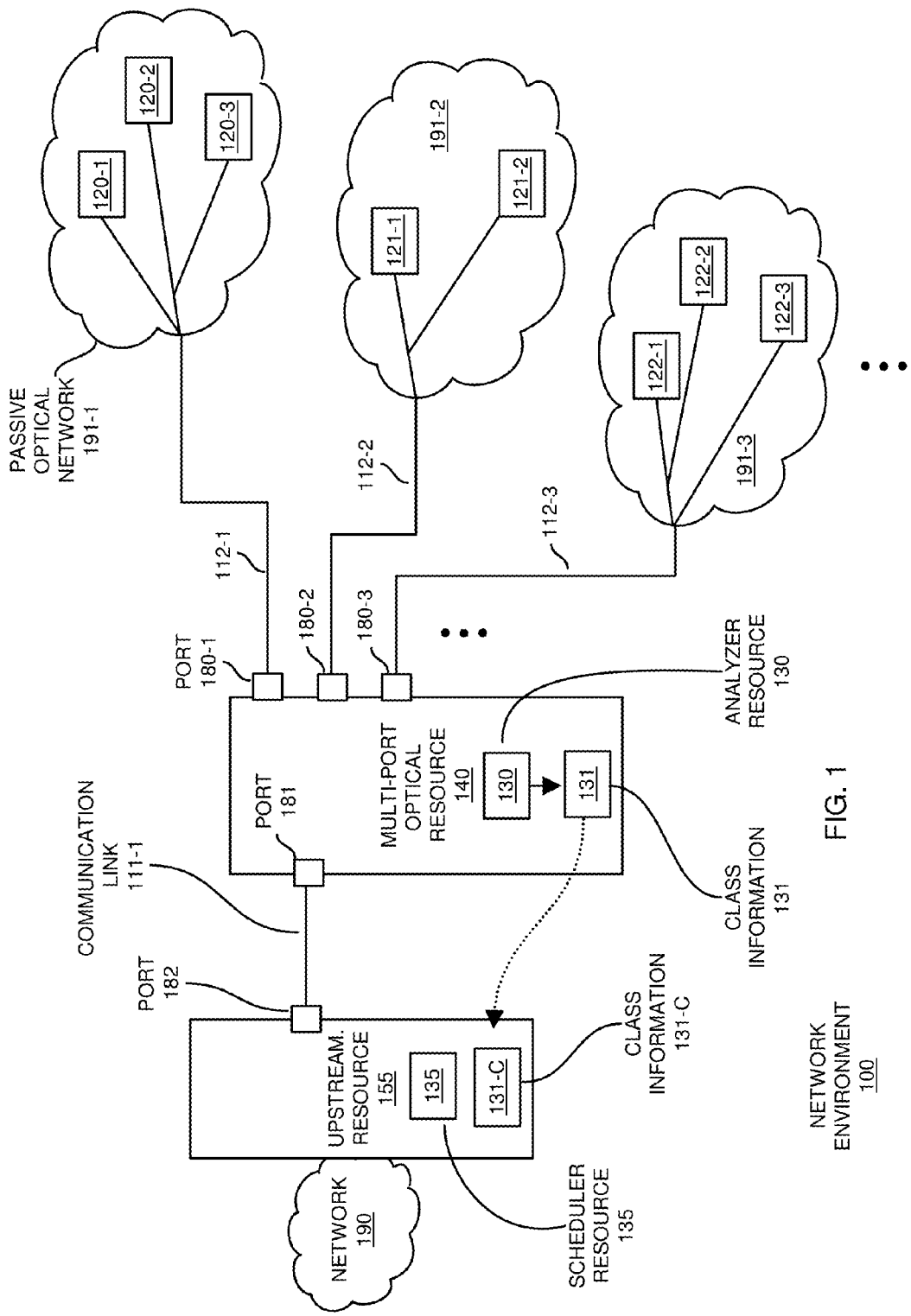
FIG. 1 is an example diagram illustrating generation and use of class information according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

Now, more specifically, FIG. 1 is an example diagram illustrating generation and use of class information according to embodiments herein.

As shown, network environment 100 (such as a cable network environment) includes passive optical network 191-1, passive optical network 191-2, passive optical network 191-3, and so on.

Each of the passive optical networks 191 includes a corresponding set of communication resources (i.e., client devices such as cable modems, set-top boxes, server resources, etc.).

In one embodiment, each of multiple subscriber domains in a network environment includes one or more communication resources to facilitate retrieval and transmission of data in a cable network environment.

In this non-limiting example embodiment, passive optical network 191-1 includes communication resource 120-1, communication resource 120-2, and communication resource 120-3; passive optical network 191-2 includes communication resource 121-1 and communication resource 121-2; passive optical network 191-3 includes communication resource 122-1, communication resource 122-2, and communication resource 122-2. Accordingly, groupings of communication resources (such as client devices) reside in different passive optical networks.

Each of the passive optical networks 191 is communicatively coupled to a respective port of multi-port optical resource 140 via a respective shared communication link.

For example, passive optical network 191-1 is communicatively coupled to port 180-1 of multi-port optical resource 140 via communication link 112-1 (such as a first shared communication link); passive optical network 191-2 is communicatively coupled to port 180-2 of multi-port optical resource 140 via communication link 112-2 (such as a second shared communication link); passive optical network 191-3 is communicatively coupled to port 180-3 of multi-port optical resource 140 via communication link 112-3 (such as a third shared communication link); and so on.

Each of the communication links 112 (such as communication link 112-1, communication link 112-2, communication link 112-3) can be any suitable optical carrier medium such as a fiber optic link.

Each of the communication resources can be configured to include an optical transmitter to communicate upstream to the multi-port optical resource 140. In one embodiment, each of the communication resources in a respective passive optical network transmits in the upstream direction to multi-port optical resource 140 at a substantially similar or same wavelength such as 1611 nanometers or other suitable wavelength. That is, each of the communication resources can include a respective optical transmitter fabricated to transmit at a substantially same wavelength of light. As previously discussed, simultaneous transmission of the signals from multiple communication resources in the same passive optical network can cause optical beat interference.

Multi-port optical resource 140 receives the upstream optical communications from the multiple communication resources transmitted over the communication links 112 and through the multiple ports 180. For example, port 180-1 of the multi-port optical resource 140 receives upstream optical communications from a first grouping of client devices (e.g., communication resources 120) residing in passive optical network 191-1; port 180-2 of the multi-port optical resource 140 receives upstream optical communications from a second grouping of client devices (e.g., communication resources 121) residing in passive optical network 191-2; and so on.

As further discussed later in this specification, multi-port optical resource 140 can be configured to include appropriate hardware to transmit encoded data (e.g., commands, scheduling information, content, etc., downstream communication resources in each passive optical network.

In one non-limiting example embodiment, multi-port optical resource 140 includes analyzer resource 130. As its name suggests, analyzer resource 130 analyzes communications received from the communication resources in passive optical networks 191. Based on the analysis of received communications, the analyzer resource 130 produces class information 131 indicating in which of the multiple passive optical networks 191 each of the communication resources resides.

Subsequent to generating the class information 131, multi-port optical resource 140 generates and forwards a copy of class information 131-C to upstream resource 155 such as a cable modem termination system in a cable network environment. The copy of class information 131-C can be transmitted to the upstream resource 155 over any suitable communication link.

For efficiency reasons, and to provide increased upstream throughput of data from the communication resources, multi-port optical resource 140 can be configured to combine communications received from the communication resources into a single signal (such as an RF signal). The multi-port optical resource 140-1 transmits the output signal from port 181 over communication link 111-1 to port 182 of the upstream resource 155.

The upstream resource 155 receives the signal (including communications from the communication resources in different passive optical networks 191) from multi-port optical resource 140 and, where appropriate, facilitates further transmission of communications received from the communication resources over communication link 111-1 to appropriate one or more destinations in network 190. In other words, in certain instances, the upstream resource 155 further transmits communications to appropriate destinations in network 190.

In a reverse direction, the upstream resource 155 can be configured to facilitate transmission of data in a downstream direction to multi-port optical resource 140. For example, upstream resource 155 can be configured to generate a respective RF signal including content directed to communication resources in respective passive optical networks 191. The multi-port optical resource 140 converts the RF signal into one or more respective downstream optical signal transmitted to the communication resources over the respective communication links 112. Communication resources receive and process the received optical signal to retrieve data directed to the respective communication resources.

A respective communication resource can ignore certain downstream-transmitted data such as data not including a network address of the respective communication resource.

In general, upstream resource 155 includes scheduler resource 135. In one embodiment, the scheduler resource 135 uses the copy of class information 131-C to control upstream communications from the communication resources over respective communication links 112 to multi-port optical resource 140.

More specifically, in one non-limiting example embodiment, the scheduler resource 135 uses the copy of class information 131-C to schedule future upstream communications from the communication resources in the different passive optical networks such that no two or more communication resources in the same passive optical network transmit upstream on a respective shared communication link at the same time.

As previously discussed, each of the communication resources in the downstream can be configured to include an optical transmitter, each of which transmits at substantially the same wavelength. Via scheduler resource 135, scheduling of only one upstream communication resource at a time in a respective passive optical network prevents optical beat interference.

In one embodiment, because communication links 112 are independent of each other, the scheduler resource 135 can allow one communication resource from each passive optical network to simultaneously transmit in an upstream direction without experiencing a loss of data due to optical beat interference.

Figure 2:
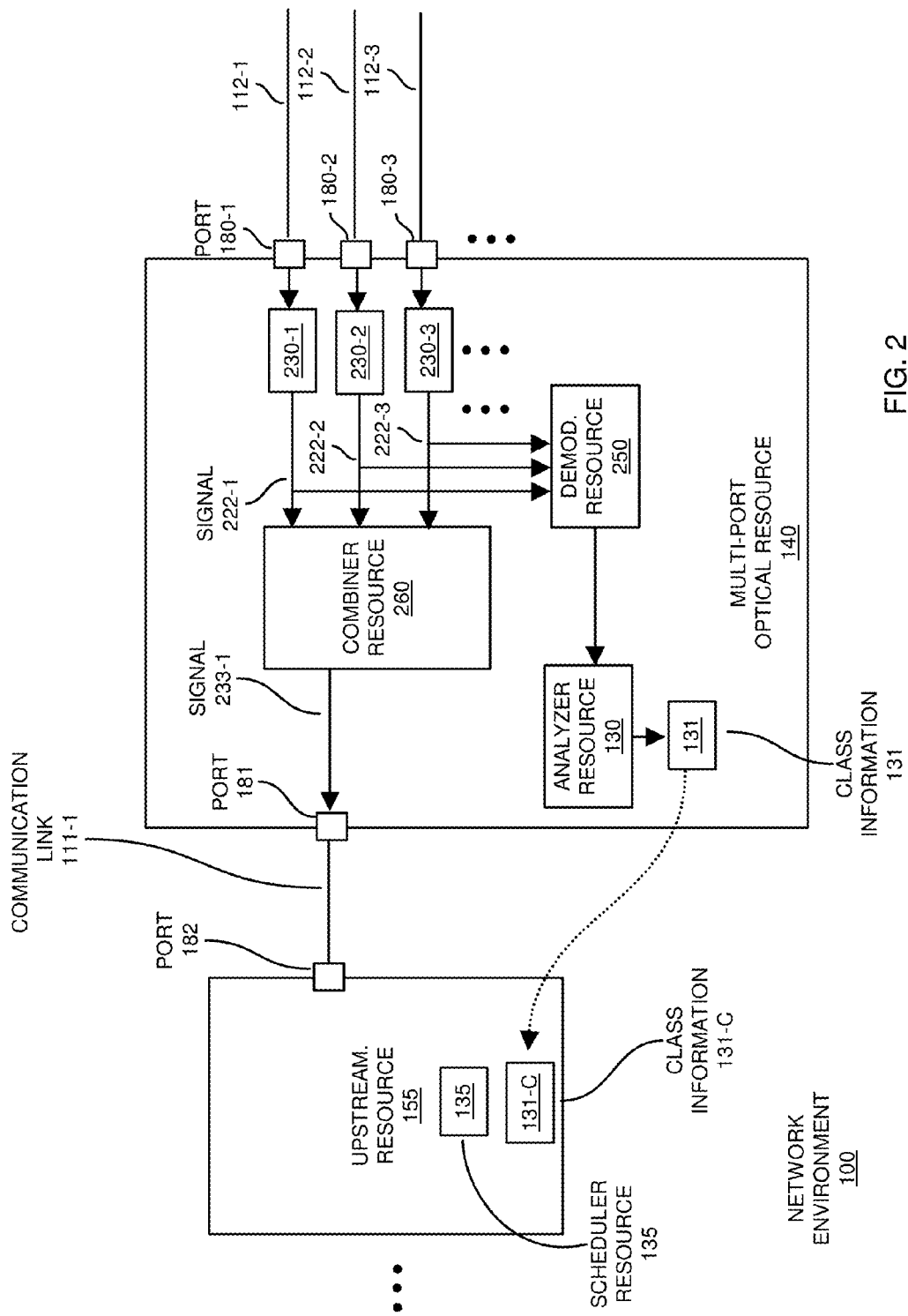
FIG. 2 is an example diagram illustrating generation of class information in a multi-port optical resource according to embodiments herein.

FIG. 2 is an example diagram illustrating more specific details of generating class information in a multi-port optical resource according to embodiments herein.

As shown, and as previously discussed, multi-port optical resource 140 can include a respective optical detector to convert a received optical signal into a respective electrical signal.

For example, in one embodiment, optical detector 230-1 receives a respective optical signal transmitted from a communication resource in passive optical network 191-1 over communication link 112-1 and through port 180-1; optical detector 230-2 receives a respective optical signal transmitted from a resource in passive optical network 191-2 over communication link 112-2 and through port 180-2; optical detector 230-3 receives a respective optical signal transmitted from a resource in passive optical network 191-3 over communication link 112-3 and through port 180-3; and so on.

Optical detector 230-1 converts the optical signal received over communication link 112-1 into electrical signal 222-1; optical detector 230-2 converts the optical signal received over communication link 112-2 into electrical signal 222-2; optical detector 230-3 converts the optical signal received over communication link 112-3 into electrical signal 222-3; and so on.

In one non-limiting example embodiment, the optical signals received over respective communication links 112 are RF-modulated optical signals. In such an instance, the optical detectors 230 convert the optical signals into respective RF electrical signals 222.

As further shown, and as its name suggests, combiner resource 260 (such as an RF combiner) combines electrical signals 222 into RF signal 233-1 outputted on port 181 over communication link 111-1 (such as a coaxial cable or other suitable communication medium) to upstream resource 155.

Accordingly, each of the communication resources in a respective passive optical network can communicate in an upstream direction to upstream resource 155.

As previously discussed, embodiments herein can include detecting in which of multiple passive optical networks 191 each of the communication resources reside. To achieve this end, in one embodiment, multi-port optical resource 140 can include demodulator resource 250. Demodulator resource 250 receives the electrical signals 222 produced by optical detectors 230.

Each of the communications from the communication resources can include a respective unique (source) network address indicating from which of the communication resources the communications are transmitted in the upstream direction over a respective communication link. Demodulator resource 250 demodulates the communications received from the client devices in each of the different passive optical networks.

Subsequent to demodulating, the demodulator resource 250 forwards the detected data associated with received communications to analyzer resource 130. Analyzer resource 130 analyzes the received upstream communications (demodulated signal data) to identify a unique identifier value (such as a network address) associated with a respective upstream communication.

Based on which of the ports each of the communications are received, and the detected network address information associated with communications received on a respective port 180, the analyzer resource 130 produces class information 131 indicating in which of the multiple passive optical networks 191 each of the communication resources (client devices) resides.

For example, demodulator resource 250 forwards first data obtained from demodulated signal 222-1 to analyzer resource 130; analyzer resource 130 analyzes the (source) network addresses of communications in the first data to identify communication resources in the first passive optical network 191-1. Demodulator resource 250 forwards second data obtained from demodulated signal 222-2 to analyzer resource 130; analyzer resource 130 analyzes the (source) network addresses of communications in the second data to identify communication resources in the second passive optical network 191-2.

Accordingly, embodiments herein can include demodulating the received upstream optical communications to identify a network address associated with a respective client device sending the upstream optical communication and producing class information indicating in which of the multiple passive optical networks the respective client device resides.

FIG. 3 is an example diagram illustrating an example of class information indicating in which of multiple passive optical networks each of multiple communication resources resides according to embodiments herein.

Assume in this example that analyzer resource 130 detects that each of one or more upstream communications (such as one or more messages) as encoded in signal 222-1 (and as received on port 180-1) include a network address assigned to communication resource 120-1. The network address indicates that communication resource 120-1 generated the one or more upstream communications. In such an instance, the analyzer resource 130 assigns the communication resource 120-1 to class #1 because the communication was received on port 180-1 from passive optical network 191-1.

Further in this example, analyzer resource 130 detects that one or more upstream communications (such as one or more messages) as encoded in signal 222-1 (and as received on port 180-1) include a network address assigned to communication resource 120-2. The network address indicates that communication resource 120-2 generated the one or more upstream communications. In such an instance, the analyzer resource 130 assigns the communication resource 120-2 to class #1 because the one or more communications were received on port 180-1 from passive optical network 191-1.

Further in this example, analyzer resource 130 detects that one or more upstream communications (such as one or more messages) as encoded in signal 222-1 (and as received on port 180-1) include a network address assigned to communication resource 120-3. The network address indicates that communication resource 120-3 generated the one or more upstream communications. In such an instance, the analyzer resource 130 assigns the communication resource 120-3 to class #1 because the communication was received on port 180-1 from passive optical network 191-1.

Assume that analyzer resource 130 detects that one or more upstream communications (such as one or more messages) as encoded in signal 222-2 (and as received on port 180-2) include a network address assigned to communication resource 121-1. The network address indicates that communication resource 121-1 generated the one or more upstream communications. In such an instance, the analyzer resource 130 assigns the communication resource 121-1 to class #2 because the communication was received on port 180-2 from passive optical network 191-2.

Further in this example, analyzer resource 130 detects that one or more upstream communications (such as one or more messages) as encoded in signal 222-2 (and received on port 180-2) include a network address assigned to communication resource 121-2. The network address indicates that communication resource 121-2 generated the one or more upstream communications. In such an instance, the analyzer resource 130 assigns the communication resource 121-2 to class #2 because the communication was received on port 180-2 from passive optical network 191-2.

In this manner, the analyzer resource 130 assigns the detected communication resources in the passive optical networks 191 to different classes.

By way of a non-limiting example, the analyzer resource 130 can be configured to produce the class #1 to indicate the unique addresses of the communication resources in first passive optical network 191-1; the analyzer resource 130 can be configured to produce the class #2 to indicate the unique addresses of the communication resources in second passive optical network 191-2; and so on.

Figure 4:
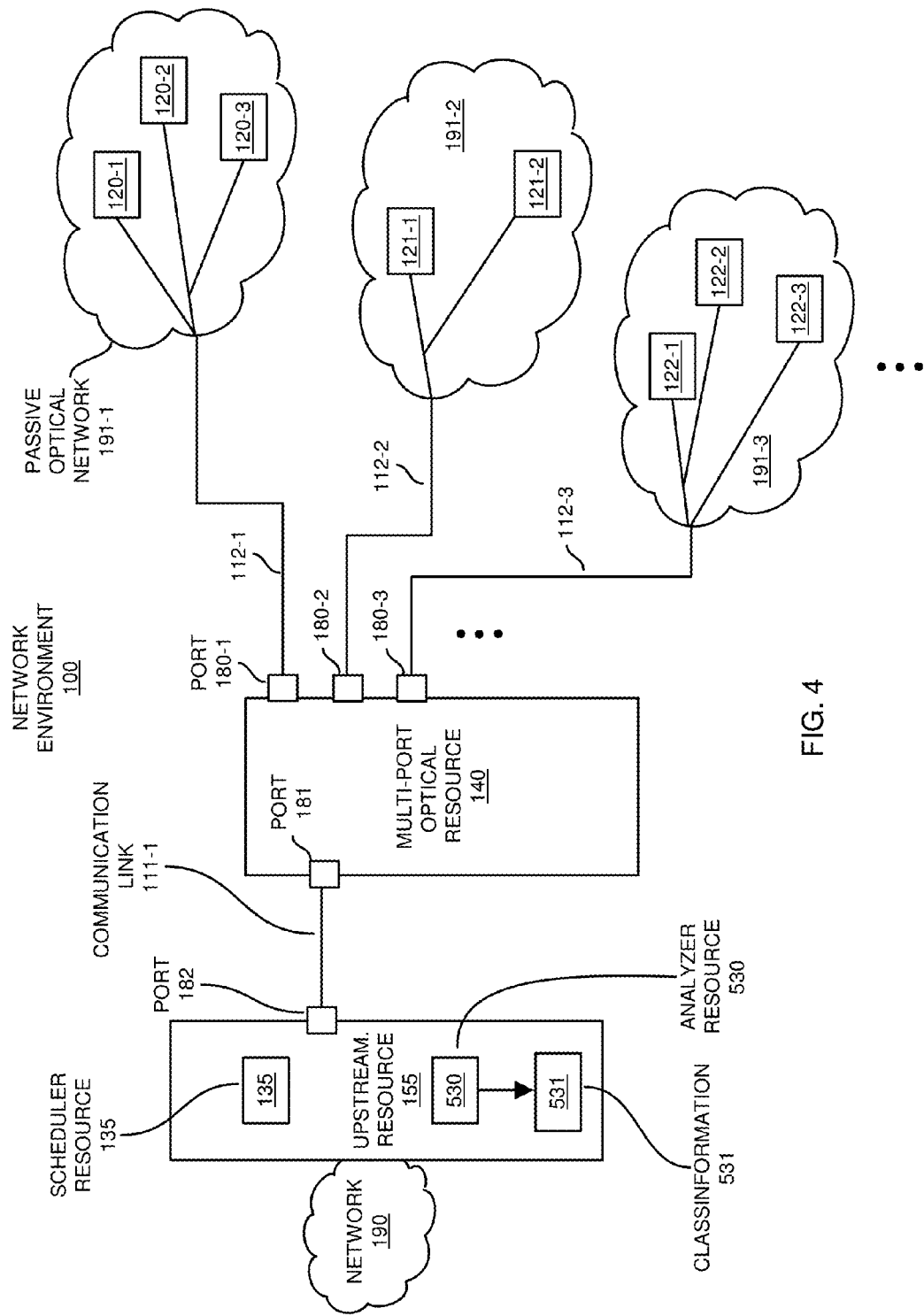
FIG. 4 is an example diagram illustrating classification of communication resources based on time-based range bins according to embodiments herein.

FIG. 4 is an example diagram illustrating classification of communication resources based on time-based range bins according to embodiments herein.

As previously discussed, groupings of different communication resources reside in different passive optical networks 191. For example, each of the passive optical networks 191 is communicatively coupled to a respective port of a multi-port optical resource 140. The multi-port optical resource 140 receives upstream communications from the multiple communication resources over the multiple ports 180.

In this example embodiment, the upstream resource 155 includes an analyzer resource 530 to analyze respective communications received from the communication resources in different passive optical networks 191. In general, based on analyzing transit times associated with the messages from respective communication resources, the analyzer resource 530 produces class information 531.

In one embodiment, as further discussed below, the class information 530 indicates in which of multiple passive optical networks 191 each of the communication resources resides.

Figure 5:
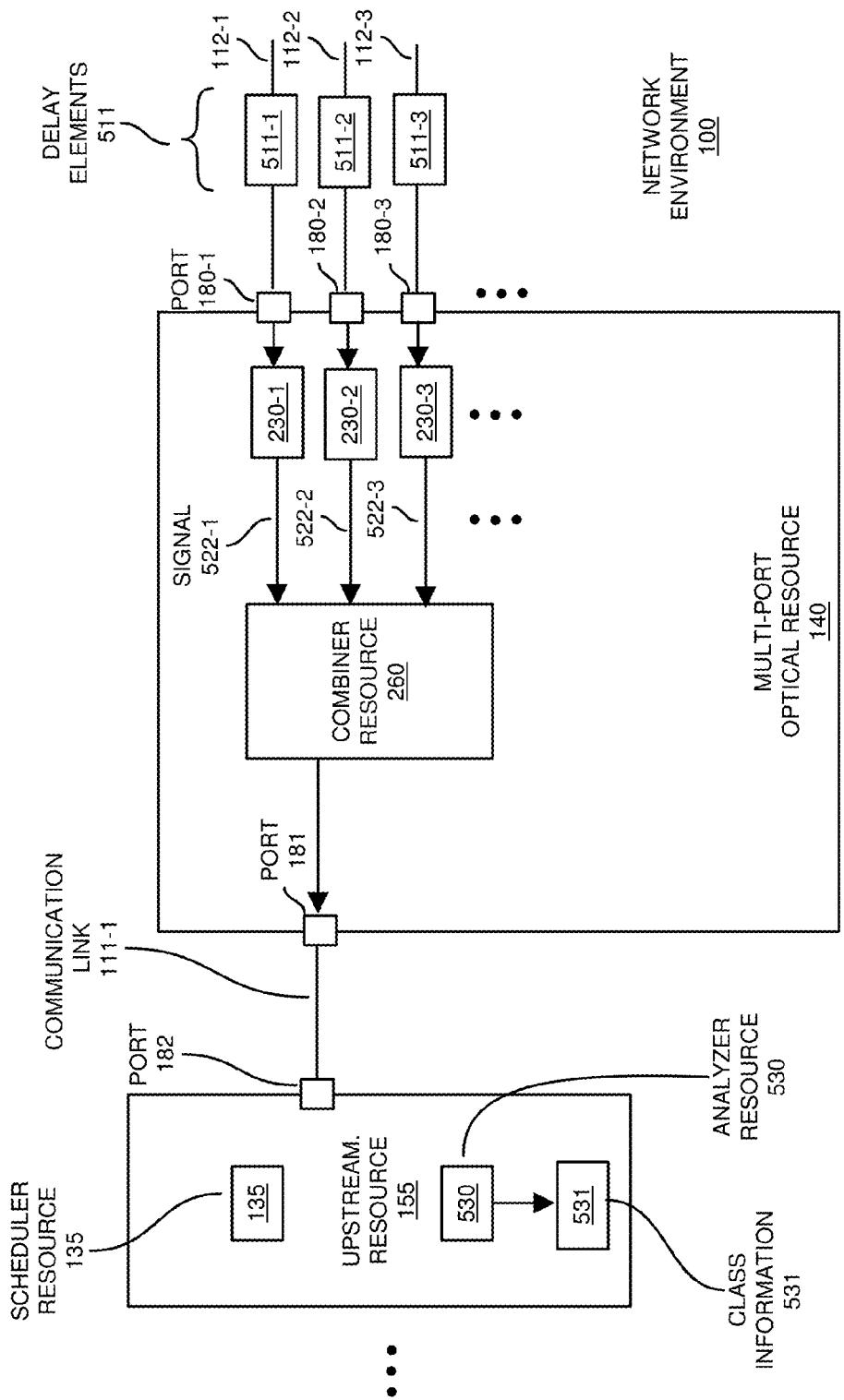
FIG. 5 is an example diagram illustrating addition of delay elements in multiple communication paths according to embodiments herein

FIG. 5 is an example diagram illustrating modification of multiple communication paths to facilitate determination of which of multiple passive optical networks each of multiple communication resources resides according to embodiments herein In a manner as previously discussed, the multi-port optical resource 140 includes detector resources 230 to convert the upstream optical communications received on the multiple ports 180 into respective electrical signals 522.

For example, first optical detector 230-1 in multi-port optical resource 140 receives optical communications from a first group of communication resources 120 residing in a first passive optical network 190-1; second optical detector 230-2 in multi-port optical resource 140 receives optical communications from a second group of communication resources 121 residing in a second passive optical network 191-2; third optical detector 230-3 in multi-port optical resource 140 receives optical communications from a third group of communication resources 122 residing in a third passive optical network 191-3; and so on.

As shown, the first optical detector 230-1 converts a received optical signal on the first port 180-1 into a first electrical signal 522-1 (such as a first RF signal); the second optical detector 230-2 converts a received optical signal on the second port 180-2 into a second electrical signal 522-2 (such as a second RF signal); the third optical detector 230-3 converts a received optical signal on the third port 180-3 into a third electrical signal 522-3 (such as a second RF signal); and so on.

In a similar manner as previously discussed, a combiner resource 260 combines the first electrical signal 522-1, second electrical signal 522-2, third electrical signal 522-3, etc., to produce a single RF output signal. The multi-port optical resource 140 transmits the RF output signal to an upstream resource 511 such as a cable modem termination system or other suitable resource.

In this non-limiting example embodiment, each of one or more of the communication paths extending from combiner resource 260 to respective passive optical networks 191 can be configured to include a respective delay elements 511 such that transit times associated with communications from communication resources in a first passive optical network 191-1 fall within a first time range; transit times associated with communications from communication resources in the second passive optical network 191-2 fall within a second time range; transit times associated with communications from communication resources in the second passive optical network 191-3 fall within a third time range; and so on.

More specifically, communication link 112-1 includes delay element 511-1 to delay communications received from communication resources 120 in passive optical network 191-1; communication link 112-2 includes delay element 511-2 to delay communications received from communication resources 121 in passive optical network 191-2; communication link 112-3 includes delay element 511-3 to delay communications received from communication resources 122 in passive optical network 191-3; and so on.

Delay elements 511 can be any suitable type of resource.

In one non-limiting example embodiment, the delay elements 511 are implemented as extra lengths of fiber optic cables such that: total fiber length from the port 180-1 of multi-port optical resource 140 to each respective communication resource in passive optical network 191-1 falls within a first range; total fiber length from the port 180-2 of multi-port optical resource 140 to each respective communication resource in passive optical network 191-2 falls within a second range; total fiber length from the port 180-3 of multi-port optical resource 140 to each respective communication resource in passive optical network 191-3 falls within a third range; and so on.

As a more specific non-limiting example embodiment, a total length of communication link (including any extra length associated with delay element 511-1) from port 180-1 to communication resource 120-1 may be 1.1 miles; a total length of communication link (including any extra length associated with delay element 511-1) from port 180-1 to communication resource 120-2 may be 1.3 miles; a total length of communication link (including any extra length associated with delay element 511-1) from port 180-1 to communication resource 120-3 may be 1.5 miles. Thus, lengths associated with communication resources 120 in passive optical network 191-1 range from 1.1 to 1.5 miles.

A total length of communication link (including any extra length associated with delay element 511-2) from port 180-2 to communication resource 121-1 may be 2.1 miles; a total length of communication link (including any extra length associated with delay element 511-2) from port 180-2 to communication resource 121-2 may be 2.3 miles. Thus, lengths associated with communication resources 121 in passive optical network 191-2 range from 2.1 to 2.3 miles.

A total length of communication link (including any extra length associated with delay element 511-3) from port 180-3 to communication resource 122-1 may be 3.1 miles; a total length of communication link (including any extra length associated with delay element 511-3) from port 180-3 to communication resource 123-2 may be 3.2 miles; a total length of communication link (including any extra length associated with delay element 511-3) from port 180-3 to communication resource 123-3 may be 3.4 miles. Thus, lengths associated with communication resources 121 in passive optical network 191-2 range from 3.1 to 3.4 miles.

In one embodiment, delay element 511-1 is one mile of fiber; delay element 511-2 is two miles of fiber; delay element 511-3 is three miles of fiber.

Transit times associated with communications transmitted over respective communication paths vary depending on cable length such that: round trip transit times (or one-way transit times) associated with communications from port 180-1 and each of communication resources 120 fall within a first time range; round trip transit times (or one-way transit times) associated with communications from port 180-2 and each of communication resources 121 fall within a second time range; round trip transit times (or one-way transit times) associated with communications from port 180-3 and each of communication resources 122 fall within a third time range; and so on.

In one embodiment, to detect a respective transit time associated with communications, the upstream resource 155 generates a downstream communication to a downstream communication resource. In response to receiving the downstream communication, the downstream communication resource responds with an upstream communication to the upstream resource 155. The upstream resource 155 measures a time delay (or round trip time) between transmitting a ping (inquiry) to a respective communication resource and a time in which the communication resource responds with a reply to the ping.

Subsequent to learning transit delays times associated with upstream messages, the upstream resource 155 or other suitable resource can be configured to forward corresponding timing information to each of the communication resources in the different passive optical networks 191. The timing information can indicate a respective unique adjustment (based on total respective fiber length) to be made by a corresponding communication resource in the upstream direction such that the communication resources do not interfere with each other in the upstream direction. Accordingly, distribution of timing information facilitates synchronization of the upstream communications.

In accordance with further embodiments, the upstream resource 155 generates class information 531 indicating in which of the passive optical networks each of the communication resources reside based on a transit time associated with the communications.

For example, assume that the upstream resource 155 detects that a transit time (such as round trip transit time, single direction transmit time, etc.) associated with a communication from a first communication resource 120-1 (having a first unique network address) falls in a first time range. The upstream resource classifies the first client resource 120-1 as residing in the first passive optical network 191-1.

Assume that the upstream resource detects that a transit time (such as round trip transit time) associated with a communication from a second communication resource 121-1 (having a second unique network address) falls in a second time range. The upstream resource classifies the second communication resource 121-1 as residing in the second passive optical network 191-2.

In this manner, the upstream resource 155 is able to determine in which of the multiple passive optical networks 191 each of the downstream located resources resides.

In a manner as previously discussed, the upstream resource 155 can be configured to use the generated class information 531 to schedule future upstream communications from the downstream resources (e.g., communication resources 120, 121, 122, etc.) in the different passive optical networks 191 such that no two or more downstream resources in a same passive optical network transmit at the same time in an upstream direction to avoid optical beat interference.

Figure 6:
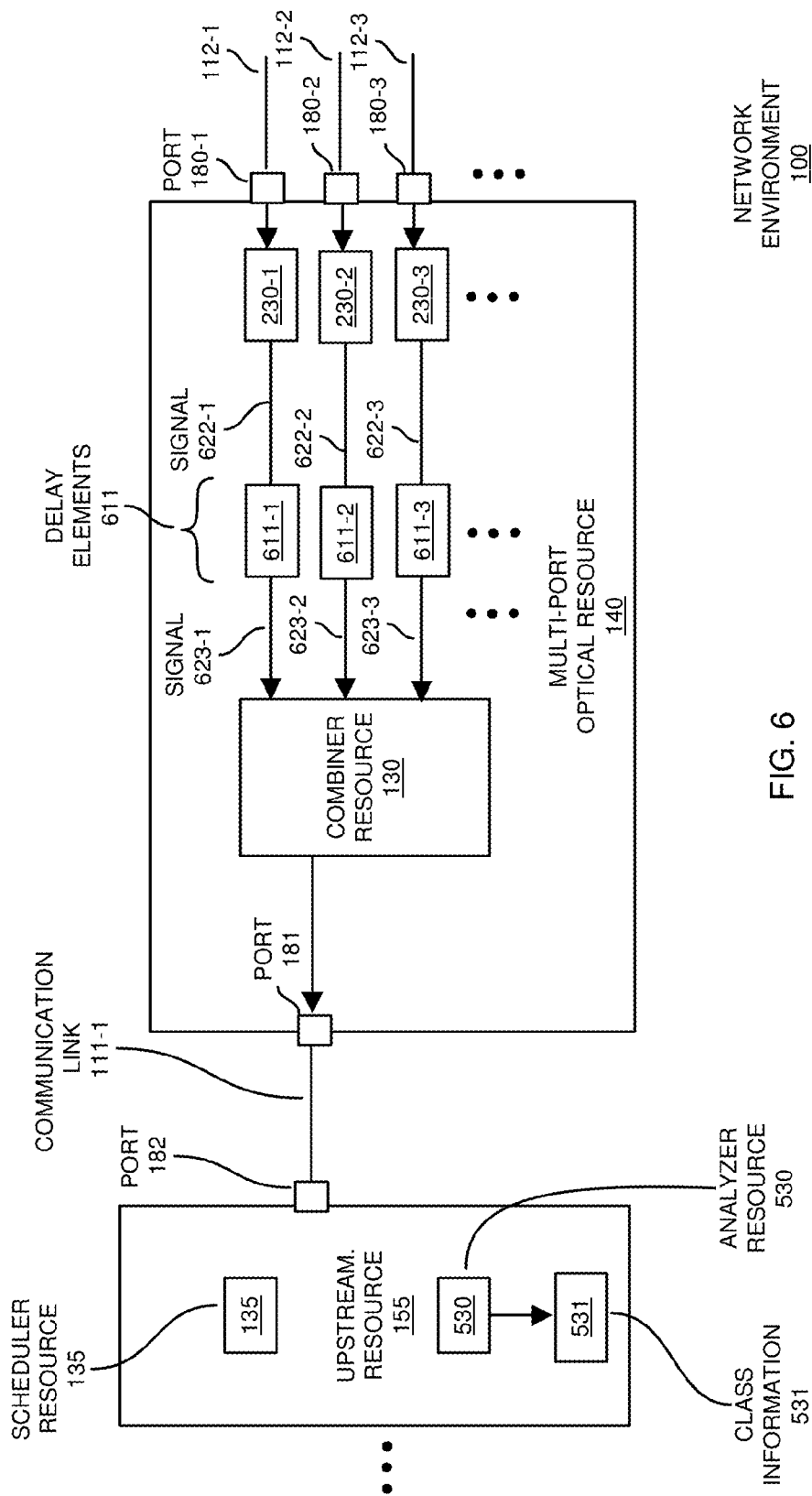
FIG. 6 is an example diagram illustrating addition of delay elements in multiple communication paths according to embodiments herein

FIG. 6 is an example diagram illustrating addition of delay elements in multiple communication paths according to embodiments herein As shown, the delays in respective communication paths can be implemented via delay elements 611. Each of the delay elements 611 delays a respective signal by a different amount such that the transit times associated with communications from a respective passive optical network fall within a same time-based range bin. For example, optical detector 230-1 receives a respective optical signal over communication link 112-1 and produces electrical signal 622-1; delay element 611-1 delays the input signal 622-1 to produce corresponding delayed electrical signal 623-1. Signal 623-1 is generally the same signal 622-1 except delayed by a predetermined as specified by delay element 611-1.

Optical detector 230-2 receives a respective optical signal over communication link 112-2 and produces electrical signal 622-2; delay element 611-2 delays the input signal 622-2 to produce electrical signal 623-2. Signal 623-2 is generally the same signal 622-2 except delayed by a predetermined as specified by delay element 611-2.

Optical detector 230-3 receives a respective optical signal over communication link 112-3 and produces corresponding electrical signal 622-3; delay element 611-3 delays the input signal 622-3 to produce corresponding electrical signal 623-3. Signal 623-3 is generally the same signal 622-3 except delayed by a predetermined as specified by delay element 611-3.

Accordingly, depending on the embodiment, a respective delay element can be placed in a respective communication path either before or after the respective optical detector 230.

Classification can be achieved via time-based range bins as discussed above and as further discussed below.

FIG. 7 is an example diagram illustrating an example of generating class information based on time-based range bins according to embodiments herein.

In this example embodiment, based on time-based range binning as discussed above, the analyzer resource 530 detects that transit times associated with communications from communication resources 120-1, 120-2, and 120-3 fall within a first time range (e.g., corresponding to transit times to communicate between 1.0 and 2.0 miles of fiber). Thus, communication resources 120-1, 120-2, and 120-3 are communicatively coupled to port 180-1 and thus reside in passive optical network 191-1.

The analyzer resource 530 detects that transit times associated with communications from communication resources 121-1 and 121-2 fall within a second time range (e.g., corresponding to transit times to communicate between 2.0 and 3.0 miles of fiber). Thus, communication resources 121-1 and 121-2 are communicatively coupled to port 180-2 and thus reside in passive optical network 191-2.

The analyzer resource 530 detects that transit times associated with communications from communication resources 122-1, 122-2, and 122-3 fall within a third time range (e.g., corresponding to transit times to communicate between 3.0 and 4.0 miles of fiber). Thus, communication resources 122-1, 122-2, and 122-3 are communicatively coupled to port 180-3 and thus reside in passive optical network 191-3.

Accordingly, based on time-based range binning (i.e., detecting in which of multiple ranges transit times associated with communications from the different communication resources falls), the analyzer resource 530 produces class information 531.

Figure 8:
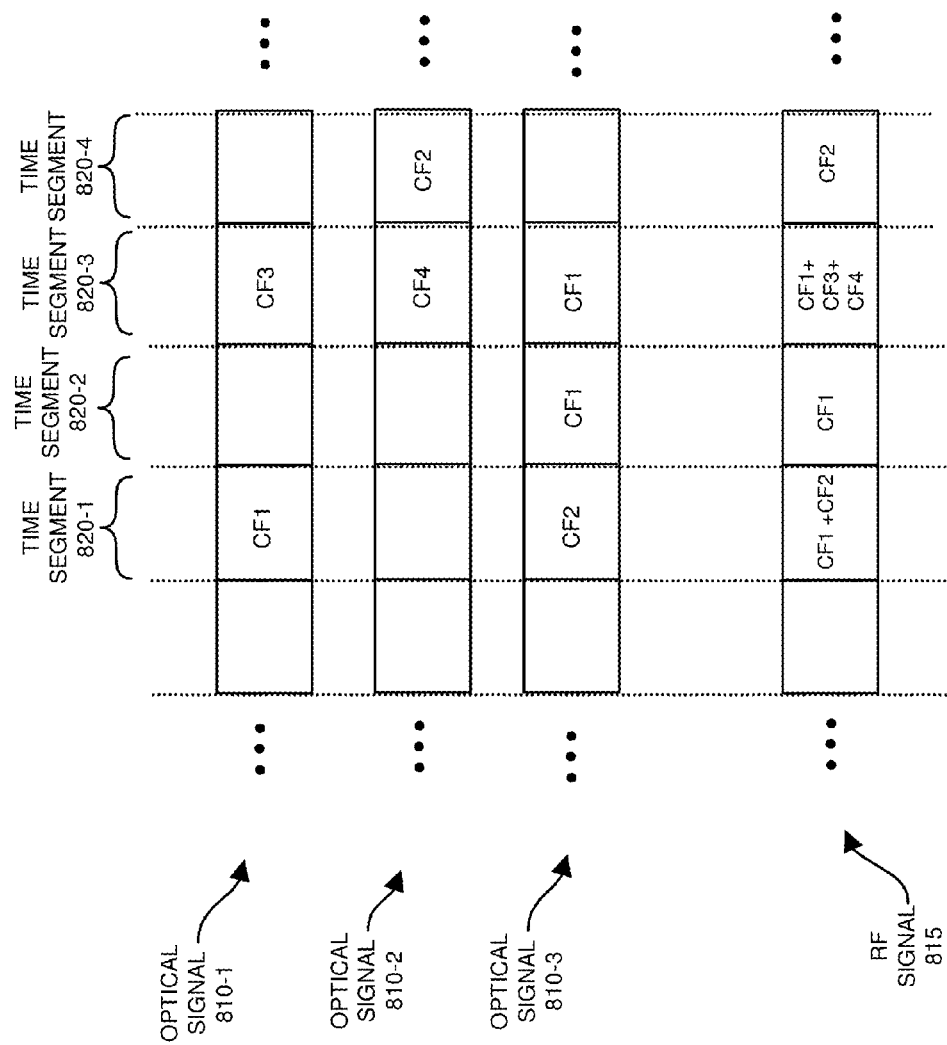
FIG. 8 is an example diagram illustrating generation of an upstream RF signal based on optical communications received from multiple passive optical networks according to embodiments herein.

FIG. 8 is an example diagram illustrating generation of an upstream RF signal based on optical communications received from multiple passive optical networks according to embodiments herein.

In this example embodiment, the optical signal 810-1 represents upstream optical communications transmitted from communication resources in passive optical network 191-1; the optical signal 810-2 represents upstream optical communications transmitted from communication resources in passive optical network 191-2; the optical signal 810-3 represents upstream optical communications transmitted from communication resources in passive optical network 191-3; and so on.

In this non-limiting example embodiment, the scheduler resource 135 schedules simultaneous upstream communications from different passive optical networks 191 using one of multiple different carrier frequencies such as carrier frequency CF1, carrier frequency CF2, carrier frequency CF3, and carrier frequency CF4.

For example, when granting upstream bandwidth, the scheduler resource 135 schedules a communication resource in a first passive optical network 191-1 to communicate data (at a first RF carrier frequency CF1) upstream over communication link 112-1 in time segment 820-1; in the same time segment 820-1, the scheduler resource 135 also schedules a communication resource in a second passive optical network 191-2 to communicate data (at a second RF carrier frequency CF2) over communication link 112-3 in time segment 820-1. In such an instance, and in a manner as previously discussed, the combiner resource 260 produces RF signal 815 (the signal transmitted over communication link 111-1 to upstream resource 155) to include the corresponding communications in time segment 820-1 at the multiple carrier frequencies CF1+CF2 as shown.

Further in this example, assume that the scheduler resource 135 schedules a communication resource in passive optical network 191-3 to communicate data (at the first RF carrier frequency CF1) in time segment 820-2. No other communication resources are scheduled to communicate in the upstream direction. In a manner as previously discussed, the combiner resource 260 produces RF signal 815 (electrical signal) for transmission over communication link 111-1 to include the corresponding communication in time segment 820-2 at the carrier frequency CF1 as shown.

Further in this example, the scheduler resource 135 schedules a communication resource in a first passive optical network 191-1 to communicate data (at RF carrier frequency CF3) upstream over communication link 112-1 in time segment 820-3; the scheduler resource 135 also schedules a communication resource in passive optical network 191-2 to communicate data (at RF carrier frequency CF4) over communication link 112-2 in time segment 820-3; the scheduler resource 135 also schedules a communication resource in passive optical network 191-3 to communicate data (at RF carrier frequency CF1) over communication link 112-3 in time segment 820-3. In a manner as previously discussed, the combiner resource 260 produces RF signal 815 (electrical signal) to include the corresponding communications in time segment 820-3 at the multiple carrier frequencies CF1+CF3+CF4 as shown.

Further in this example, the scheduler resource 135 schedules a communication resource in passive optical network 191-2 to communicate data (at RF carrier frequency CF2) in time segment 820-4. No other communication resources are scheduled to communicate in the upstream direction. In a manner as previously discussed, the combiner resource 260 produces RF signal 815 (electrical signal) to include the corresponding communication in time segment 820-4 at the carrier frequency CF2 as shown.

Accordingly, communication resources in different passive optical networks are able to simultaneously communicate in an upstream direction.

Figure 9:
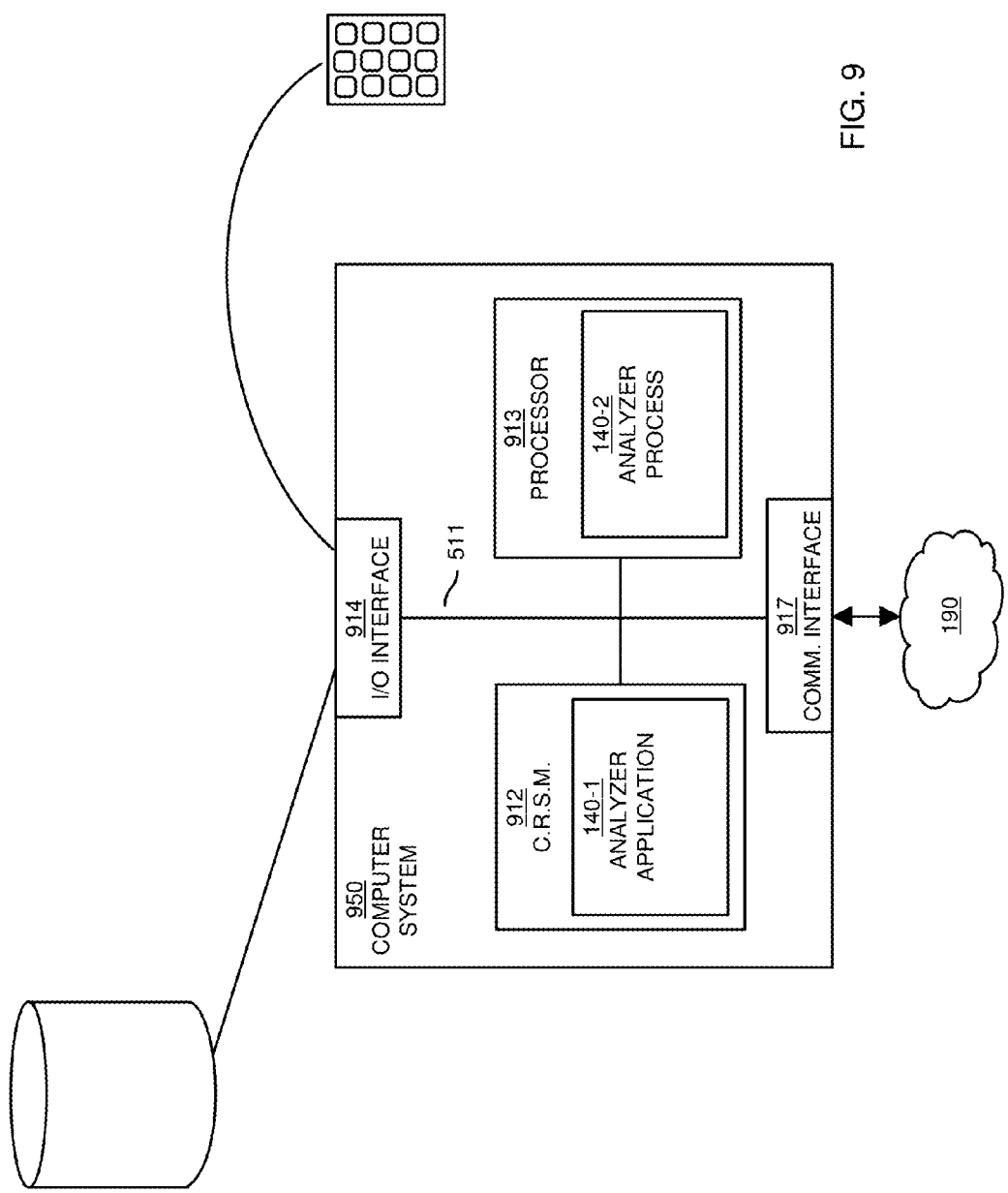
FIG. 9 is a diagram illustrating an example computer architecture in which to execute any of the functionality according to embodiments herein.

FIG. 9 is an example block diagram of a computer device for implementing any of the operations as discussed herein according to embodiments herein.

As shown, computer system 950 such as a computer device, a server resource, a wireless access point, etc., of the present example can include an interconnect 911 that couples computer readable storage media 912 such as a non-transitory type of media (i.e., any type of hardware storage medium) in which digital information can be stored and retrieved, a processor 913 (e.g., one or more processor devices of hardware, computer processor hardware, etc.), I/O interface 914, and a communications interface 917.

I/O interface 914 provides connectivity to a repository and, if present, other devices such as a playback device, display screen, keypad, a computer mouse, etc.

Computer readable storage medium 912 can be any hardware storage resource or device such as memory, optical storage, hard drive, floppy disk, etc. In one embodiment, the computer readable storage medium 912 stores instructions and/or data.

Communications interface 917 enables the computer system 950 and processor 913 to communicate over a resource such as network 190 to retrieve information from remote sources and communicate with other computers. I/O interface 914 enables processor 913 to retrieve stored information from repository.

As shown, computer readable storage media 912 is encoded with analyzer application 130-1 (e.g., software, firmware, etc.) executed by processor 813. Data management application 130-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in analyzer application 130-1 stored on computer readable storage medium 912.

Execution of the analyzer application 130-1 produces processing functionality such as analyzer process 130-2 in processor 913. In other words, the analyzer process 130-2 associated with processor 913 represents one or more aspects of executing analyzer application 130-1 within or upon the processor 913 in the computer system 950.

Those skilled in the art will understand that the computer system 950 can include other processes and/or software and hardware components, such as an operating system that controls allocation and use of hardware resources to execute analyzer application 130-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 750 may reside at any location or can be included in any suitable resource in network environment 100 to implement functionality as discussed herein.

Note that each of resources such as the scheduler resource 135, analyzer resource 530, etc., can include a respective application of instructions, computer readable storage medium to store the instructions, and a processor to execute the instructions to carry out respective functions as discussed herein.

Functionality supported by the different resources will now be discussed via flowcharts in FIG. 10. Note that the steps in the flowcharts below can be executed in any suitable order.

Figure 10:
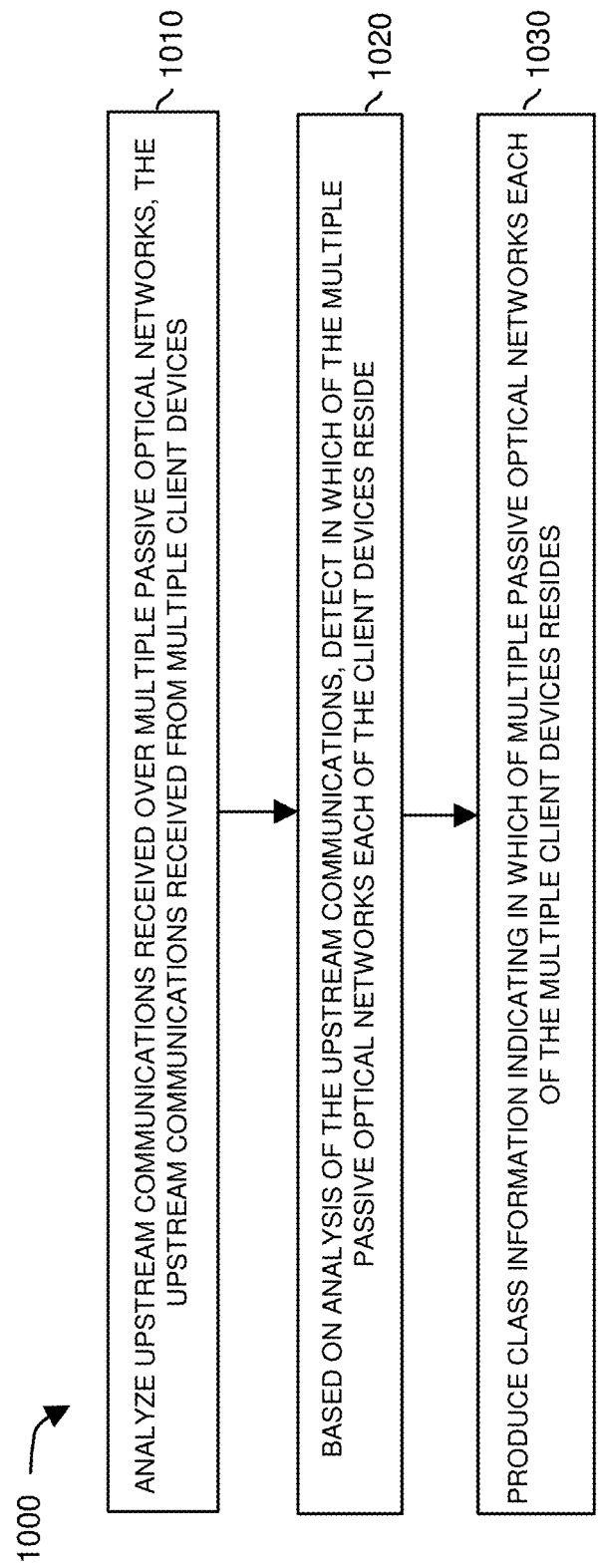
FIG. 10 is an example diagram illustrating methods according to embodiments herein.

FIG. 10 is a flowchart 1000 illustrating an example method according to embodiments. Note that there will be some overlap with respect to concepts as discussed above.

In processing block 1010, an analyzer resource analyzes upstream communications received over multiple passive optical networks 191. The upstream communications are received from multiple respective client devices (such as communication resources 120, communication resources 121, communication resources 122, etc.).

In processing block 1020, based on analysis of the upstream communications, the analyzer resource detects in which of the multiple passive optical networks 191 each of the client devices reside.

In processing block 1030, the analyzer resource produces class information (131 or 531 depending on the embodiment) indicating in which of multiple passive optical networks 191 each of the multiple client devices resides.

Note again that techniques herein are well suited for management of upstream optical communications. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   via computer processor hardware, performing operations of:
   analyzing upstream communications received over multiple passive optical networks, the upstream communications received from multiple client devices;
   based on analysis of the upstream communications, detecting in which of the multiple passive optical networks each of the client devices resides;
   producing class information indicating in which of the multiple passive optical networks each of the multiple client devices resides; and
   initiating distribution of the class information to a scheduler resource, the scheduler resource scheduling timing of future upstream communications from the multiple client devices based on which of the multiple passive optical networks the client devices reside as indicated by the class information.

2. The method as in claim 1 further comprising:
   receiving the upstream communications from the multiple client devices over the multiple passive optical networks, each of the multiple client devices transmitting at a substantially same optical wavelength.

3. The method as in claim 2 further comprising:
   receiving first optical communications from a first group of client devices at a first optical port of a multi-port optical resource, the first group of client devices residing in a first passive optical network communicatively coupled to the first optical port;
   receiving second optical communications from a second group of client devices at a second optical port of the multi-port optical resource, the second group of client devices residing in a second passive optical network communicatively coupled to the second optical port;
   analyzing the first optical communications received from the first group of client devices at the first optical port to identify unique addresses of the client devices in the first group;
   analyzing the second optical communications received from the second group of client devices at the second optical port to identify unique addresses of the client devices in the second group;
   producing the class information to indicate that the unique addresses of the client devices in the first group belong to a first class representing client devices in the first passive optical network; and
   producing the class information to indicate that the unique addresses of the client devices in the second group belong to a second class representing client devices in the second passive optical network.

4. The method as in claim 2 further comprising:
   scheduling the future upstream communications from the multiple client devices based on which of the multiple passive optical networks each of the multiple client devices reside as specified by the class information.

5. The method as in claim 4, wherein the future upstream communications are scheduled such that no more than one client device in a respective passive optical network communicates upstream at the same time.

6. The method as in claim 5, wherein the future upstream communications are scheduled such that a first client device in a first passive optical network transmits a first optical communication upstream at substantially the same time as a second client device in a second passive optical network transmits a second optical communication upstream, the first optical communication modulated in accordance with a first RF carrier frequency, the second optical communication modulated in accordance with a second RF carrier frequency;
   converting the first optical communication into a first radio frequency signal;
   converting the second optical communication into a second radio frequency signal; and
   combining the first radio frequency signal and the second radio frequency signal into a radio frequency output signal; and
   transmitting the radio frequency output signal upstream to a cable modem termination system in a cable network environment.

7. The method as in claim 1, wherein detecting in which of the multiple passive optical networks each of the client devices reside further comprises:
   receiving the upstream communications from the multiple client devices on multiple optical ports of a multi-port optical resource, each of the multiple ports communicatively coupled to a corresponding passive optical network of the multiple passive optical networks; and
   producing the class information to map network addresses of the multiple client devices to a respective passive optical network depending on which of the multiple optical ports the upstream communications are received.

8. The method as in claim 1 further comprising:
   for each of the multiple client devices:
   receiving an upstream optical communication from a respective client device;
   demodulating the received upstream optical communication to identify a network address associated with the respective client device sending the upstream optical communication; and
   producing class information indicating in which of the multiple passive optical networks the respective client device resides.

9. The method as in claim 1 further comprising:
   receiving a first upstream optical communication at substantially the same time as a second upstream optical communication, the first upstream optical communication received from a first client device, the first client device residing in a first passive optical network, the second upstream optical communication received from a second client device, the second client device residing in a second passive optical network;
   converting the first upstream optical communication into a first radio frequency signal;
   converting the second upstream optical communication into a second radio frequency signal;
   combining the first radio frequency signal and the second radio frequency signal into a radio frequency output signal; and
   transmitting the radio frequency output signal upstream to an upstream resource in a cable network environment.

10. The method as in claim 1 further comprising:
    via the class information, scheduling transmission of no more than one upstream optical communication at a time amongst client devices in a respective passive optical network to avoid optical beat interference amongst the client devices.

11. The method as in claim 1 further comprising:
    introducing a different respective communication delay to upstream communications received on each of the multiple passive optical networks; and identifying in which of the multiple passive optical networks each of the client devices resides based on delays associated with received upstream communications from the client devices.

12. The method as in claim 11, wherein identifying in which of the multiple passive optical networks each of the client devices resides further comprises:
receiving an RF signal, the RF signal encoded to include the upstream communications from the client devices in the multiple passive optical networks.

13. The method as in claim 1 further comprising:
adding a first delay to a first communication path, the first delay delaying upstream communications received from a first passive optical network of the multiple passive optical networks; and
adding a second delay to a second communication path, the second delay delaying upstream communications received from a second passive optical network of the multiple passive optical networks.

14. The method as in claim 13, wherein adding the first delay includes adding a first length of optical fiber to delay upstream communications received on a first optical port of a multi-port optical resource, the first length of optical fiber delaying upstream communications from the first passive optical network by a first amount of time; and
wherein adding the second delay includes adding a second length of optical fiber to delay upstream communications received on a second optical port of the multi-port optical resource, the second length of optical fiber delaying upstream communications from the second passive optical network by a second amount of time.

15. The method as in claim 13, wherein the first delay and the second delay ensure that transit times associated with upstream communications from client devices in the first passive optical network fall within a first time range and that transit times associated with upstream communications from client devices in the second passive optical network fall within a second time range.

16. The method as in claim 1 further comprising:
communicating a downstream message to the client devices, the downstream message notifying the client devices to generate the upstream communications that are used to determine in which of the multiple passive optical networks the client devices reside.

17. The method as in claim 1 further comprising:
at the scheduler resource, using the class information to schedule the future upstream communications from the multiple client devices in the multiple passive optical networks such that no more than one of the client devices transmits corresponding communications over a shared communication link in the upstream direction at a time.

18. The method as in claim 1 further comprising:
detecting in which of the multiple passive optical networks each of the client devices resides based on respective communication ports over which communications from the client devices are received.

19. The method as in claim 1 further comprising:
detecting in which of the multiple passive optical networks each of the client devices resides based on round trip transit times of communicating between a communication management resource and each of the client devices.

20. The method as in claim 19 further comprising:
in response to detecting that a transit time of a communication from a first client device falls in a first time range, classifying the first client device as residing in a first passive optical network; and
in response to detecting that a transit time of a communication from a second client device falls in a second time range non-overlapping with the first time range, classifying the second client device as residing in a second passive optical network.

21. The method as in claim 20 further comprising:
at the scheduler resource, using the class information to schedule the future upstream communications from the multiple client devices such that no more than one of the client devices device transmits in the upstream direction at a time.

22. The method as in claim 1 further comprising:
producing the class information to indicate that a first set of multiple client devices resides in a first passive optical network of the multiple passive optical networks, the first set of multiple client devices sharing use of a first communication path to communicate in the upstream direction; and
producing the class information to indicate that a second set of multiple client devices resides in a second passive optical network of the multiple passive optical networks, the second set of multiple client devices share use of a second communication path to communicate in the upstream direction.

23. The method as in claim 1 further comprising:
at the scheduler resource, using the class information to schedule the future upstream communications from the multiple client devices such that no more than one of the client devices device transmits in the upstream direction at a time.

24. A communication apparatus comprising:
multiple optical ports on which to receive upstream communications from multiple client devices in a network environment;
analyzer hardware operable to analyze the upstream communications received over the multiple optical ports, the analyzer hardware detecting in which of multiple passive optical networks each of the client devices reside based on the upstream communications; and
an output port, the analyzer hardware communicating class information to a scheduler resource, the class information indicating in which of multiple passive optical networks each of the multiple client devices resides; and
wherein the scheduler resource is operable to schedule timing of future upstream communications from the multiple client devices through the output port depending on which of the classes the client devices reside.

25. The communication apparatus as in claim 24, wherein each of the multiple client devices transmits in an upstream direction at a substantially similar optical wavelength.

26. The communication apparatus as in claim 24, wherein each of the multiple optical ports is communicatively coupled to a corresponding passive optical network of the multiple passive optical networks; and
wherein the analyzer hardware is operable to map network addresses of the multiple client devices to a respective passive optical network depending on which of the multiple optical ports the upstream communications are received.

27. The communication apparatus as in claim 24, wherein the analyzer hardware is operable to:
receive a corresponding upstream optical communication from a respective client device;

demodulate the corresponding upstream optical communication to identify a network address associated with the respective client device transmitting the corresponding upstream optical communication; and produce the class information to indicate in which of the multiple passive optical networks the respective client device resides based on which of the multiple optical ports the corresponding upstream optical communication is received.

28. The communication apparatus as in claim 27 further comprising:
a converter resource;
a combiner resource;
an output port;
the converter resource converting a first upstream communication received on a first optical port into a first radio frequency signal;
the converter resource converting a second upstream communication received on a second optical port into a second radio frequency signal;
the combiner resource combining the first radio frequency signal and the second radio frequency signal into a radio frequency output signal; and
the output port transmitting the radio frequency output signal upstream.

29. The communication apparatus as in claim 24, wherein the scheduler resource is operable to schedule transmission of no more than one of the upstream optical communications at a time in a respective passive optical network to avoid optical beat interference amongst client devices in the respective passive optical network.

30. An apparatus comprising:
an input port to receive upstream communications from multiple client devices in a network environment;
analyzer hardware operable to analyze the upstream communications, the analyzer hardware operable to detect in which of the multiple passive optical networks each of the client devices reside based on timing of the upstream communications; and
a scheduler resource, the scheduler resource scheduling timing of upstream communications from the client devices depending on which of the multiple passive optical networks in which the client devices reside.

31. The apparatus as in claim 30, wherein each of the multiple client devices transmits an upstream optical communication in an upstream direction at a substantially similar optical wavelength; and
wherein the scheduler resource schedules transmission of no more than one of the upstream optical communications at a time in a respective passive optical network to avoid optical beat interference amongst client devices in the respective passive optical network.

32. The apparatus as in claim 31, wherein the scheduler resource schedules future upstream communications such that a first client device in a first passive optical network transmits a first optical communication upstream at substantially the same time as a second client device in a second passive optical network transmits a second optical communication upstream, the first optical communication modulated into a first signal in accordance with a first RF carrier frequency, the second optical communication modulated into a second signal in accordance with a second RF carrier frequency, the first signal and second signal transmitted upstream through the output port.

33. The apparatus as in claim 30, wherein the upstream communications are delayed by different amounts depending on which of the multiple passive optical networks the client devices reside; and
wherein the scheduler resource identifies in which of the multiple passive optical networks each of the client devices resides based on delays associated with received upstream communications from the client devices.

34. The apparatus as in claim 33, wherein the input port receives an RF signal, the RF signal encoded to include the upstream communications from the client devices in the multiple passive optical networks.

35. The apparatus as in claim 30, wherein the upstream communications includes a first set of communications, the first set of communications received over a first communication path from a first passive optical network, the first communication path including a first delay element, the first delay element delaying each communication in the first set; and
wherein the upstream communications includes a second set of communications, the second set of communications received over a second communication path from a second passive optical network, the second communication path including a second delay element, the second delay element delaying each communication in the second set.

36. The apparatus as in claim 35, wherein the first delay element and the second delay element ensure that transit times associated with upstream communications from client devices in the first passive optical network fall within a first time range and that transit times associated with upstream communications from client devices in the second passive optical network fall within a second time range.

37. The apparatus as in claim 30, wherein the analyzer resource communicates a downstream message to the client devices, the downstream message notifying the client devices to generate the upstream communications that are used to determine in which of the multiple passive optical networks the client devices reside.

38. A computer system comprising:
computer processor hardware; and
a hardware storage resource coupled to the computer processor hardware, the hardware storage resource storing instructions that, when executed by the computer processor hardware, cause the computer processor hardware to perform operations of:
analyzing upstream communications received over multiple passive optical networks, the upstream communications received from multiple client devices;
based on analysis of the upstream communications, detecting in which of the multiple passive optical networks each of the client devices reside;
producing class information indicating in which of multiple passive optical networks each of the multiple client devices resides; and
initiating distribution of the class information to a scheduler resource, the scheduler resource scheduling timing of future upstream communications from the multiple client devices based on which of the multiple passive optical networks in which the client devices reside as indicated by the class information.

39. Computer-readable hardware storage having instructions stored thereon, the instructions, when carried out by computer processor hardware, causes the computer processor hardware to perform operations of:

analyzing upstream communications received over multiple passive optical networks, the upstream communications received from multiple client devices;
based on analysis of the upstream communications, detecting in which of the multiple passive optical networks each of the client devices reside;
producing class information indicating in which of multiple passive optical networks each of the multiple client devices resides; and
initiating distribution of the class information to a scheduler resource, the scheduler resource scheduling timing of transmitting future upstream communications from the multiple client devices based on which of the multiple passive optical networks in which the client devices reside as indicated by the class information.

* * * * *